(12) United States Patent
Yegin et al.

(10) Patent No.: US 8,843,753 B2
(45) Date of Patent: Sep. 23, 2014

(54) MACHINE-TO-MACHINE NODE ERASE PROCEDURE

(75) Inventors: Alper Yegin, Istanbul (TR); Youngkyo Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 13/447,597

(22) Filed: Apr. 16, 2012

(65) Prior Publication Data

US 2012/0265979 A1 Oct. 18, 2012

Related U.S. Application Data

(60) Provisional application No. 61/475,972, filed on Apr. 15, 2011, provisional application No. 61/485,275, filed on May 12, 2011, provisional application No. 61/544,577, filed on Oct. 7, 2011.

(51) Int. Cl.
*H04L 29/06* (2006.01)
*H04W 4/00* (2009.01)
*G06F 21/57* (2013.01)
*G06F 9/44* (2006.01)

(52) U.S. Cl.
CPC .......... *G06F 21/57* (2013.01); *H04L 63/0807* (2013.01); *G06F 9/4401* (2013.01); *H04W 4/005* (2013.01); *G06F 2221/2143* (2013.01); *H04L 63/126* (2013.01); *H04W 4/001* (2013.01)

USPC .......................................... 713/181

(58) Field of Classification Search
USPC .................................... 713/153, 181
See application file for complete search history.

(56) References Cited

U.S. PATENT DOCUMENTS

2007/0258440 A1* 11/2007 Watanabe ...................... 370/352
2009/0217038 A1* 8/2009 Lehtovirta et al. ............. 713/168
2010/0304716 A1* 12/2010 Hoeksel et al. ................ 455/411

OTHER PUBLICATIONS

"Generic Bootstrapping Architecture (GBA) Framework", 3GPP2 S.S0109-0 Version 1.0, Mar. 30, 2006, 59 pages.
"Study for Machine-to-Machine (M2M) Communication for cdma2000 Networks", 3GPP2 S.R0141-0 Version 1.0, Dec. 9, 2010, 31 pages.
"Machine-to-Machine communications (M2M); mla, dla and mld interface", ETSI TS 102 921 V1.1.1, Feb. 2012, 9 pages.

* cited by examiner

*Primary Examiner* — Michael S McNally
(74) *Attorney, Agent, or Firm* — Jefferson IP Law, LLP (57) ABSTRACT

A method for erasing bootstrapping, at a device or a gateway in a Machine-to-Machine (M2M) service is provided. The method includes receiving an erase request containing a first M2M-Erase-Token from an M2M Authentication Server (MAS) or an M2M Service Bootstrapping Function (MSBF), processing the erase request based on the first M2M-Erase-Token or a local policy of the device or the gateway, and sending an erase response containing a second M2M-Erase-Token to the MAS or the MSBF.

52 Claims, 7 Drawing Sheets

MACHINE-TO-MACHINE NODE ERASE PROCEDURE

CROSS-REFERENCE TO RELATED APPLICATIONS

This application claims the benefit under 35 U.S.C. §119 (e) of a U.S. provisional application filed on Apr. 15, 2011 in the U.S. Patent and Trademark Office and assigned Ser. No. 61/475,972, and of a U.S. provisional application filed on May 12, 2011 in the U.S. Patent and Trademark Office and assigned Ser. No. 61/485,275, and of a U.S. provisional application filed on Oct. 7, 2011 in the U.S. Patent and Trademark Office and assigned Ser. No. 61/544,577, the entire disclosures of which are hereby incorporated by reference.

BACKGROUND OF THE INVENTION

1. Field of the Invention

The present invention relates to a Machine-to-Machine (M2M) Bootstrap Procedure. More particularly, the present invention relates to an M2M Bootstrap Procedure that authenticates an M2M Device/Gateway with an M2M Service Provider, and allows the M2M Device/Gateway to download service parameters that are needed for utilizing the M2M service, such as a long-term M2M Service Root key (Kmr), IP address of network servers (e.g., M2M Network Node, device management server, etc.), etc.

2. Description of the Related Art

Figure 1:
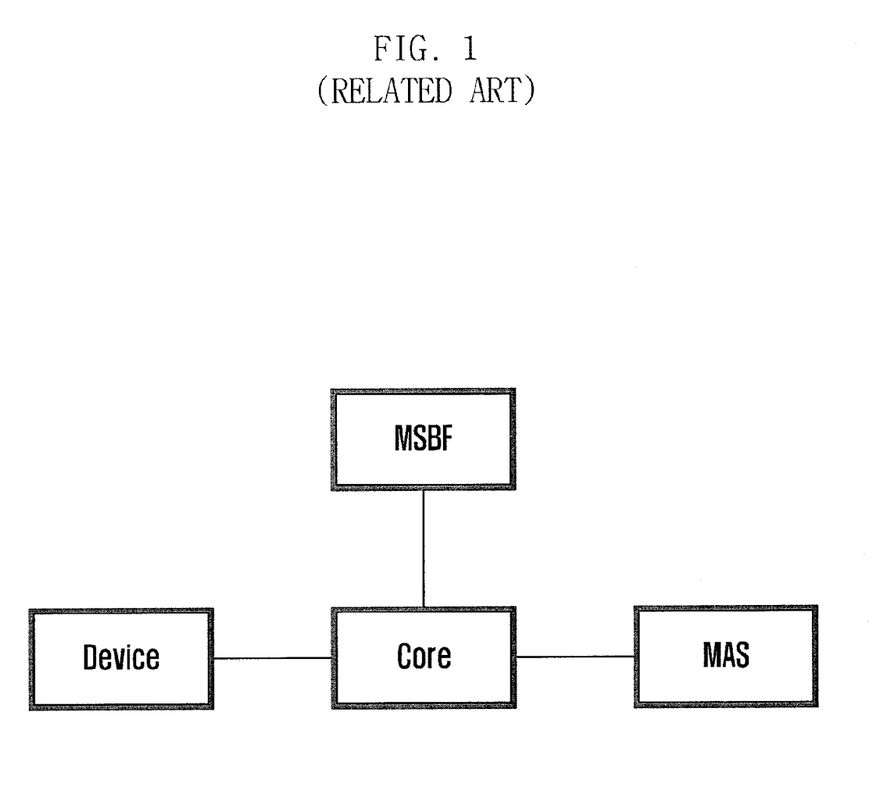
FIG. 1 depicts network elements for Machine-to-Machine (M2M) Bootstrap and Connection Procedures according to the related art.

FIG. 1 depicts network elements involved in the M2M Bootstrap and M2M Connection Procedures according to the related art.

Referring to FIG. 1, the lines connecting the network elements show the communication interfaces used among them. Device is the entity seeking to get bootstrapped in order to start using the M2M facilities provided by the M2M Core network. Device engages in bootstrap procedure with an M2M Service Bootstrapping Function (MSBF) via the Core network. At the end of the bootstrap, a root secret key is generated (Kmr), which will be used for cryptographically securing the application communication over the M2M network Kmr is made available to the MAS (M2M service layer AAA Server) on the network side. Later, when the device wants to connect to the Core Network for receiving M2M service, the device goes through the Connection Procedure with the MAS via the Core network.

No procedure has been defined for reversing the effects of the bootstrap procedure. Accordingly, a procedure is desired for Device/Gateway and M2M Service Provider to erase the configuration parameters, subscription and service state generated by the Bootstrap Procedure. Such a procedure is desired when the Device/Gateway's service ties with the Service Provider needs to be severed (i.e., an unsubscribe procedure).

In the absence of an erase procedure, M2M bootstrap state (i.e., service subscription) cannot be fully managed. Full management of such state requires not only creation of the state but also the deletion of the state by the involved parties. So, a Device/Gateway, an MAS, and an M2M Service Bootstrapping Function (MSBF) shall be able to erase a bootstrap state. Otherwise, a Device/Gateway that bootstrapped with a given service provider stays in that state forever.

There are legitimate scenarios where a Device/Gateway decides to leave the service (e.g., switching from one service provider to another), or the service provider decides to remove the Device/Gateway from its subscriber base (e.g., unpaid bill, decommissioned device, etc.). Unless these actions are performed with state coordination on both sides, it can create ghost state and wasteful procedures (e.g., service provider trying to access a Device/Gateway that has left its service without notice).

Aspects of the present invention are to address at least the above-mentioned problems and/or disadvantages and to provide at least the advantages described below. Accordingly, an aspect of the present invention is to provide a method for erasing bootstrapping when a Device/Gateway decides to leave the M2M service or the service provider decides to remove the Device/Gateway from its subscriber base.

Another aspect of the present invention is to provide a method for Erase Procedure for being initiated by either the Device/Gateway, or a network element such as an M2M Service Bootstrap Function (MSBF) or an M2M Authentication Server (MAS).

Aspects of the present invention applies to M2M systems whether they use automated bootstrapping of the M2M Devices/Gateways, or they rely on pre-provisioning (e.g., during manufacturing time). Aspects of the present invention are agnostic to the methods used as the bootstrap and connection procedures (e.g., PANA, TLS, GBA). It can be used no matter what method is used for creating the M2M state.

In accordance with an aspect of the present invention, a method for erasing bootstrapping, at a device or a gateway in an M2M service is provided. The method includes receiving an erase request containing an M2M-Erase-Token from an MAS or an MSBF, processing the erase request based on the M2M-Erase-Token of the erase request or a local policy of the device or the gateway, and sending an erase response containing an M2M-Erase-Token to the MAS or the MSBF.

In accordance with another aspect of the present invention, a device or a gateway for erasing bootstrapping in an M2M service is provided. The device or the gateway includes a transceiver for communicating signals with an MAS or an MSBF, and a controller for receiving an erase request containing an M2M-Erase-Token from an MAS or an MSBF, for processing the erase request based on the M2M-Erase-Token of the erase request or a local policy of the device or the gateway, and for sending a erase response containing an M2M-Erase-Token to the MAS or the MSBF.

Other aspects, advantages, and salient features of the invention will become apparent to those skilled in the art from the following detailed description, which, taken in conjunction with the annexed drawings, discloses exemplary embodiments of the invention.

DESCRIPTION OF DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, an Erase Procedure may be initiated by either the Device/Gateway, or a network element such as an M2M Service Bootstrap Function (MSBF) or an M2M Authentication Server (MAS). According to exemplary embodiments of the present invention, no other network element initiates this procedure.

When the Erase Procedure is initiated by the Device/Gateway, the Erase Procedure may be directed towards either the MSBF or the MAS. This invention covers both possibilities. Which one is used is a decision left to the architectures and deployments using these schemes.

When initiated by any of these aforementioned elements, the procedure provides origin authentication, integrity and replay protection so that it cannot be exploited for denial-of service attacks by unauthorized elements.

Example 1

MSBF-Initiated Erase Procedure

Figure 2:
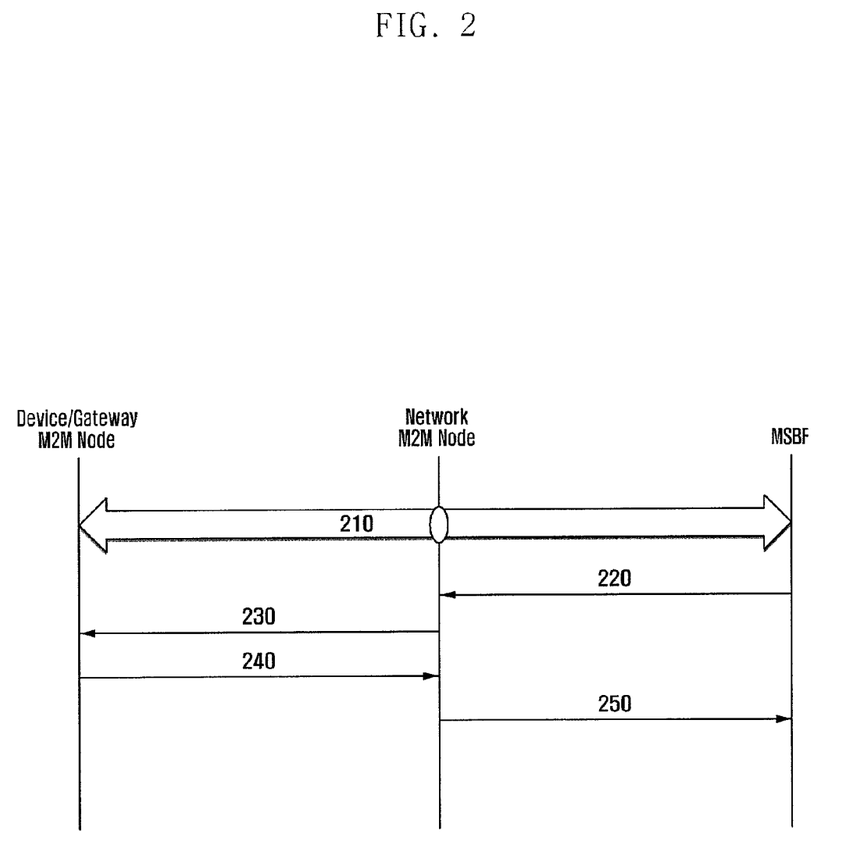
FIG. 2 depicts a call flow for an M2M Service Bootstrapping Function (MSBF)-initiated Erase Procedure according to an exemplary embodiment of the present invention.

FIG. 2 depicts a call flow for an MSBF-initiated Erase Procedure of Example 1 according to an exemplary embodiment of the present invention.

Referring to FIG. 2, the MSBF initiates the M2M Bootstrap Procedure in step 210. For the Erase Procedure to take place, it is assumed that the Device/Gateway and the MSBF has already executed the Bootstrap Procedure. This procedure may involve an intermediary, such as Network M2M Node, or not.

At the end of the Bootstrap Procedure, the Device/Gateway and the MSBF end up sharing a secret key called Kmr Depending on the specific protocol used for the Bootstrap Procedure, additional keying material may also be present on these end-points (e.g., Extensible Master Session Key (EMSK) when EAP protocol is used).

When the MSBF decides to initiate the Erase Procedure in step 220, the MSBD sends an Erase Request to the Device/Gateway. This request may be relayed to the Device/Gateway via an intermediary, such as Network M2M Node (as illustrated in FIG. 1), or directly sent to the Device/Gateway. The decision to initiate the Erase Procedure belongs to the MSBF, and the details of the decision-making process are outside the scope of this description.

The Erase Request contains a payload called Erase Token. This token conveys the intent of the sender along with the cryptographic proof about the authentication and integrity of the token.

Erase Token contains the following information elements, and may also include additional elements.

M2M Node ID: This information element contains the identifier of the Device/Gateway M2M Node that will be erased.

Key Index: This information element contains the index of the shared secret key (e.g., Kmr index ($I_{K_{mr}}$)). Such indices are used when there may be multiple instances of the same key. Each instance distinguished from the others with the help of a key index. This information element may be included only when the key used for the hash function has an index value, and may be omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of request. When variations of erase procedure are needed, this Type can help differentiating among them.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In this function, "|" indicates concatenation.

The Hash-function is a one-way keyed hash function, for example HMAC-SHA256. Secret-key is a secret key shared between the Device/Gateway and the MSBF. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either.

Additional parameters (shown as "Other parameters" in the formula) may be added to the formula. If no such parameters are needed, then the "|Other parameters" part of the formula may be omitted. It is shown for the sake of illustrating potential future extensibility.

The Erase Request may be sent over one of many different protocols, such as PANA (in the form of a PANA AVP, which may be carried over PANA Termination Request or another PANA Request packet), Diameter/RADIUS (in the form of an AVP/attribute), HTTP, etc.

In step 230, the Device/Gateway receives the Erase Request.

If there is an intermediary such as Network M2M Node, the intermediary receives the Erase Request from MSBF and relays the Erase Request to the Device/Gateway. The intermediary may have to deal with two different kinds of protocols carrying the request on both sides. For example, the MSBF-facing side may be using RADIUS and the Device/Gateway-facing side may be using PANA. According to an exemplary embodiment of the present invention, the intermediary may be omitted and the request message may be directly sent from the MSBF to the Device/Gateway.

In step 240, the Device/Gateway receives and processes the Erase Request. When the Device/Gateway receives the Erase Request, the Device/Gateway verifies the hash before accepting the request as authentic.

The Device/Gateway retrieves the Secret-key by using the M2M Node ID and Key index (when present) for a look up from its local key repository. If there is no matching secret key, then the Device/Gateway shall ignore the Erase Request.

If a matching key is found, the matching key is used with the same formula as in step 220 in order to generate a Hash value. If the computed Hash does not match the Hash value in the Erase Request, then the Device/Gateway ignores the Erase Request. If the Hash is a match, then the Device/Gateway accepts this incoming Erase Request as valid.

The Device/Gateway makes a decision on how to process the Erase Request based on its local policy. For example, a Device/Gateway may be permanently configured to reject such requests. If the Device/Gateway accepts the Erase Request, then the Device/Gateway deletes its bootstrapped state after sending the Erase Response back. The Device/Gateway may put a delay before deleting such state, in case the Erase Response is not received by the MSBF and the MSBF retransmits the Erase Request (whose processing may require the state be present).

The Device/Gateway sends an Erase Response to the MSBF. This response may be sent via an intermediary such as Network M2M Node. Erase Response shall include an Erase Token.

The Erase Token contains the following information elements, and may include additional elements.

M2M Node ID: This information element contains the identifier of the Device/Gateway M2M Node being erased.

Key Index: This information element contains the index of the shared secret key (e.g., Kmr index). Such indices are used when there may be multiple instances of the same key. Each instance is distinguished from the others with the help of a key index. This information element is included only when the key used for the hash function has an index value, omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of response. It can indicate values corresponding to "Successfully erased", "Erase rejected due to local policy", etc.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In the function, "|" indicates concatenation.

Hash-function is a one-way keyed hash function, for example HMAC-SHA256. Secret-key is a secret key shared between the Device/Gateway and the MSBF. The Secret-key be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either.

Additional parameters (shown as "Other parameters" in the formula) may be added to the formula. If no such parameters are needed, then the "|Other parameters" part of the formula may be omitted. It is shown for the sake of illustrating potential future extensibility.

In step 250, the Erase Response is sent over the same protocol that carried the Erase Request.

If there is an intermediary such as Network M2M Node, the intermediary receives the Erase Response from Device/Gateway and relays it to MSBF. The intermediary may have to deal with two different kinds of protocols carrying the response on both sides. For example, the MSBF-facing side may be using RADIUS and the Device/Gateway-facing side may be using PANA. According to an exemplary embodiment of the present invention, the intermediary may be eliminated and the response message may be directly sent from the Device/Gateway to the MSBF.

When the MSBF receives the Erase Response, the MSBF verifies the hash before accepting the response as authentic. The MSBF retrieves the Secret-key by using the M2M Node ID and Key index (when present) for a look up from its local key repository. If there is no matching key, then the MSBF shall ignore the Erase Response.

If a matching key is found, the matching key is used with the same formula as in step 240 in order to generate a Hash value. If the computed Hash does not match the Hash value in the Erase Request, then the MSBF shall ignore the Erase Response.

If the Hash is a match, then the MSBF accepts this incoming Erase Response as valid. The MSBF decides what to do with the bootstrapped state associated with the Device/Gateway based on the received Type and its local policy.

Example 2

MAS-Initiated Erase Procedure

Figure 3:
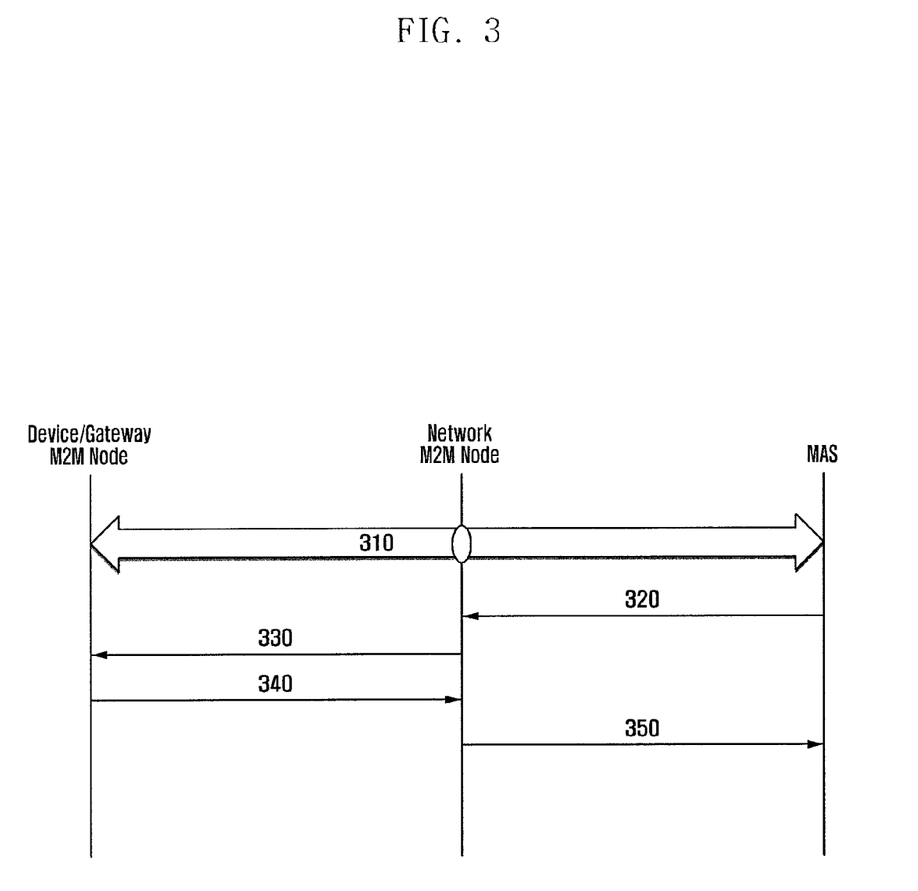
FIG. 3 depicts a call flow for an M2M Authentication Server (MAS)-initiated Erase Procedure according to an exemplary embodiment of the present invention.

FIG. 3 depicts the call flow for MAS-initiated Erase Procedure of Example 3 according to an exemplary embodiment of the present invention.

Figure 4:
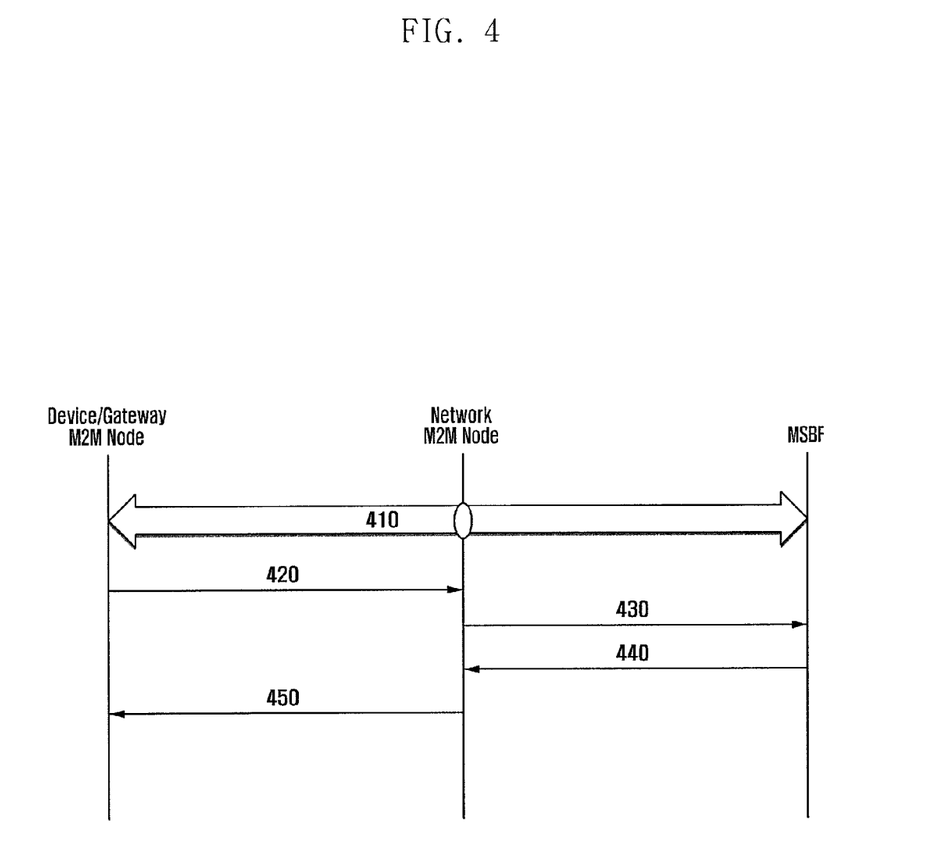
FIG. 4 depicts a call flow for Device/Gateway-initiated Erase with MSBF Procedure according to an exemplary embodiment of the present invention.

Referring to FIG. 4, the MAS determines to initiate the M2M Service Connect Procedure in step 310. For the Erase Procedure to take place, it is assumed that the Device/Gateway and the MAS have already executed the Service Connect Procedure. This procedure may involve an intermediary, such as a Network M2M Node, or not.

Prior to the Service Connect Procedure, the Device/Gateway and the MAS already share a secret key called Kmr Depending on the specific protocol used for the Service Connect Procedure, additional keying material may also be present on these end-points (e.g., Extensible Master Session Key (EMSK) when EAP protocol is used).

When the MAS decides to initiate the Erase Procedure, the MAS sends an Erase Request to the Device/Gateway in step 320. This request may be relayed to the Device/Gateway via an intermediary, such as Network M2M Node (as illustrated in FIG. 1), or directly sent to the Device/Gateway. The decision to initiate the Erase Procedure belongs to the MAS and the details of how the MAS determines whether to initiate the Erase Procedure are outside the scope of this description.

The Erase Request contains a payload called an Erase Token. This token conveys the intent of the sender along with the cryptographic proof about the authentication and integrity of the token.

The Erase Token contains the following information elements, and may include additional elements.

M2M Node ID: This information element contains the identifier of the Device/Gateway M2M Node that will be erased.

Key Index: This information element contains the index of the shared secret key (e.g., Kmr index). Such indices are used when there may be multiple instances of the same key. Each instance is distinguished from the others with the help of a key index. This information element may be included only when the key used for the hash function has an index value, and may be omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of request. When variations of erase procedure are needed, this Type can help differentiate among them.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In the formula, "|" indicates concatenation.

Hash-function is a one-way keyed hash function, for example HMAC-SHA256. Secret-key is a secret key shared between the Device/Gateway and the MAS. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation.

Additional parameters (shown as "Other parameters" in the formula) may be added to the formula. If no such parameters are needed, then the "|Other parameters" part of the formula may be omitted. It is shown for the sake of illustrating potential future extensibility.

The Erase Request may be sent over one of many different protocols, such as PANA (in the form of a PANA AVP, which may be carried over PANA Termination Request or another PANA Request packet), Diameter/RADIUS (in the form of an AVP/attribute), HTTP, etc.

In step 330, the Device/Gateway receives the Erase Request. If there is an intermediary such as Network M2M Node, the intermediary receives the Erase Request from MAS and relays the Erase Request to the Device/Gateway. The intermediary may have to deal with two different kinds of protocols carrying the request on both sides. For example, the MAS-facing side may be using RADIUS and the Device/Gateway-facing side may be using PANA. According to an exemplary embodiment of the present invention, the intermediary may be eliminated and the request message may be directly sent from the MAS to the Device/Gateway.

In step 340, the Device/Gateway receives and processes the Erase Request. When the Device/Gateway receives the Erase Request, the Device/Gateway verifies the hash before accepting the request as authentic.

The Device/Gateway retrieves the Secret-key by using the M2M Node ID and Key index (when present) for a look up from its local key repository. If there is no matching secret key, then the Device/Gateway ignores the Erase Request.

If a matching key is found, the matching key is be used with the same formula as in step 320 in order to generate a Hash value. If the computed Hash does not match the Hash value in the Erase Request, then the Device/Gateway ignores the Erase Request. If the Hash is a match, then the Device/Gateway accepts the incoming Erase Request as valid.

The Device/Gateway makes a decision on how to process the Erase Request based on its local policy. For example, a Device/Gateway may be permanently configured to reject such requests. If the Device/Gateway accepts the Erase Request, then the Device/Gateway should delete its bootstrapped state after sending the Erase Response back. The Device/Gateway may put a delay before deleting such state, in case the Erase Response is not received by the MAS and the MAS retransmits the Erase Request (whose processing requires the state be present).

The Device/Gateway sends an Erase Response to the MAS. This response may be sent via an intermediary such as Network M2M Node. Erase Response shall include an Erase Token.

Erase Token contains the following information elements, and may include additional elements.

M2M Node ID: This information element contains the identifier of the Device/Gateway M2M Node being erased.

Key Index: This information element contains the index of the shared secret key (e.g., Kmr index). Such indices are used when there may be multiple instances of the same key. Each instance is distinguished from the others with the help of a key index. This information element may be included only when the key used for the hash function has an index value, omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of response. It can indicate values corresponding to "Successfully erased", "Erase rejected due to local policy", etc.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In the formula, "|" indicates concatenation.

Hash-function is a one-way keyed hash function, for example HMAC-SHA256. Secret-key is a secret key shared between the Device/Gateway and the MAS. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either.

Additional parameters (shown as "Other parameters" in the formula) may be added to the formula. If no such parameters are needed, then the "|Other parameters" part of the formula may be omitted. It is shown for the sake of illustrating potential future extensibility.

In step 350, the Erase Response is sent over the same protocol that carried the Erase Request.

If there is an intermediary such as Network M2M Node, the intermediary receives the Erase Response from Device/Gateway and relays the Erase Response to MAS. The intermediary may have to deal with two different kinds of protocols carrying the response on both sides. For example, the MAS-facing side may be using RADIUS and the Device/Gateway-facing side may be using PANA. According to an exemplary embodiment of the present invention, the intermediary may be omitted and the response message may be directly sent from the Device/Gateway to the MAS.

When the MAS receives the Erase Response, the MAS verifies the hash before accepting the response as authentic. The MAS retrieves the Secret-key by using the M2M Node ID and Key index (when present) for a look up from its local key repository. If there is no matching key, then the MAS ignores the Erase Response.

If a matching key is found, the matching key is be used with the same formula as in step 340 in order to generate a Hash value. If the computed Hash does not match the Hash value in the Erase Request, then the MAS ignores the Erase Response.

If the Hash is a match, then the MAS accepts the incoming Erase Response as valid. The MAS decides what to do with the bootstrapped state associated with the Device/Gateway based on the received Type and its local policy.

Example 3

Device/Gateway-Initiated Erase with MSBF Procedure

FIG. 4 depicts a call flow for a Device/Gateway-initiated Erase with MSBF Procedure according to an exemplary embodiment of the present invention.

In step 410, the Device/Gateway initiates the M2M Bootstrap Procedure. For the Erase Procedure to take place, it is assumed that the Device/Gateway and the MSBF has already executed the Bootstrap Procedure. This procedure may involve an intermediary, such as Network M2M Node, or not.

At the end of the Bootstrap Procedure, the Device/Gateway and the MSBF end up sharing a secret key called Kmr. Depending on the specific protocol used for the Bootstrap Procedure, additional keying material may also be present on these end-points (e.g., Extensible Master Session Key (EMSK) when EAP protocol is used).

When the Device/Gateway decides to initiate the Erase Procedure, the Device/Gateway sends an Erase Request to the MSBF in step 420. This request may be relayed to the MSBF via an intermediary, such as Network M2M Node (as illustrated in FIG. 1), or directly sent to the MSBF. The decision to initiate the Erase Procedure is made by the Device/Gateway and the details are outside the scope of this description.

The Erase Request contains a payload called Erase Token. This token conveys the intent of the sender along with the cryptographic proof about the authentication and integrity of the token.

The Erase Token contains the following information elements, and may include additional elements.

M2M Node ID: This information element contains the identifier of the Device/Gateway M2M Node that will be erased.

Key Index: This information element contains the index of the shared secret key (e.g., Kmr index). Such indices are used when there may be multiple instances of the same key. Each instance is distinguished from the others with the help of a key index. This information element may be included only when the key used for the hash function has an index value, omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of request. When variations of erase procedure are needed, this Type can help differentiate among them.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In the formula, "|" indicates concatenation.

Hash-function is a one-way keyed hash function, for example HMAC-SHA256. Secret-key is a secret key shared between the Device/Gateway and the MSBF. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either. Additional parameters (shown as "Other parameters" in the formula) may be added to the formula. If no such parameters are needed, then the "|Other parameters" part of the formula is omitted. It is shown for the sake of illustrating potential future extensibility.

The Erase Request may be sent over one of many different protocols, such as PANA (in the form of a PANA AVP, which may be carried over PANA Termination Request or another PANA Request packet), Diameter/RADIUS (in the form of an AVP/attribute), HTTP, etc.

In step 430, the Device/Gateway receives the Erase Request. If there is an intermediary such as Network M2M Node, the intermediary receives the Erase Request from Device/Gateway and relays the Erase Request to the MSBF. The intermediary may have to deal with two different kinds of protocols carrying the request on both sides. For example, the MSBF-facing side may be using RADIUS and the Device/Gateway-facing side may be using PANA. According to another exemplary embodiment of the present invention, the intermediary may be omitted and the request message may be directly sent from the Device/Gateway to the MSBF.

In step 440, the MSBF receives and processes the Erase Request. When the MSBF receives the Erase Request, the MSBF verifies the hash before accepting the request as authentic.

The MSBF retrieves the Secret-key by using the M2M Node ID and Key index (when present) for a look up from its local key repository. If there is no matching secret key, then the MSBF ignores the Erase Request.

If a matching key is found, the matching key used with the same formula as in step 420 in order to generate a Hash value. If the computed Hash does not match the Hash value in the Erase Request, then the MSBF shall ignore the Erase Request.

If the Hash is a match, then the MSBF accepts the incoming Erase Request as valid.

The MSBF makes a decision on how to process the Erase Request based on its local policy. For example, an MSBF may be permanently configured to reject such requests. If the MSBF accepts the Erase Request, then the MSBF deletes the Device/Gateway's bootstrapped state after sending the Erase Response back. The MSBF may put a delay before deleting such state, in case the Erase Response is not received by the Device/Gateway and the Device/Gateway retransmits the Erase Request (whose processing requires the state be present).

MSBF sends an Erase Response to the Device/Gateway. This response may be sent via an intermediary such as Network M2M Node. Erase Response includes an Erase Token.

The Erase Token contains the following information elements, and may include additional elements.

M2M Node ID: This information element contains the identifier of the Device/Gateway M2M Node being erased.

Key Index: This information element contains the index of the shared secret key (e.g., Kmr index). Such indices are used when there may be multiple instances of the same key. Each instance is distinguished from the others with the help of a key index. This information element is included only when the key used for the hash function has an index value, omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of response. The type may indicate values corresponding to "Successfully erased", "Erase rejected due to local policy", etc.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In the formula, "|" indicates concatenation.

Hash-function is a one-way keyed hash function, for example HMAC-SHA256.

Secret-key is a secret key shared between the Device/Gateway and the MSBF. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either. Additional parameters (shown as "Other parameters" in the formula) may be added to the formula. If no such parameters are needed, then the "|Other parameters" part of the formula may be omitted. It is shown for the sake of illustrating potential future extensibility.

In step 450, the Erase Response is sent over the same protocol that carried the Erase Request.

If there is an intermediary such as Network M2M Node, the intermediary receives the Erase Response from MSBF and relays the Erase Response to the Device/Gateway. The intermediary may have to deal with two different kinds of protocols carrying the response on both sides. For example, the MSBF-facing side may be using RADIUS and the Device/Gateway-facing side may be using PANA. According to another exemplary embodiment of the present invention, the intermediary may be omitted and the response message can be directly sent from the MSBF to the Device/Gateway.

When the Device/Gateway receives the Erase Response, the Device/Gateway verifies the hash before accepting the response as authentic. The Device/Gateway retrieves the Secret-key by using the M2M Node ID and Key index (when present) for a look up from its local key repository. If there is no matching key, then the Device/Gateway ignores the Erase Response.

If a matching key is found, the matching key may be used with the same formula as in step 440 in order to generate a Hash value. If the computed Hash does not match the Hash value in the Erase Request, then the Device/Gateway shall ignore the Erase Response.

If the Hash is a match, then the Device/Gateway accepts this incoming Erase Response as valid. Device/Gateway decides what to do with the bootstrapped state associated with itself based on the received Type and its local policy.

Example 4

Device/Gateway-Initiated Erase with MAS Procedure

Figure 5:
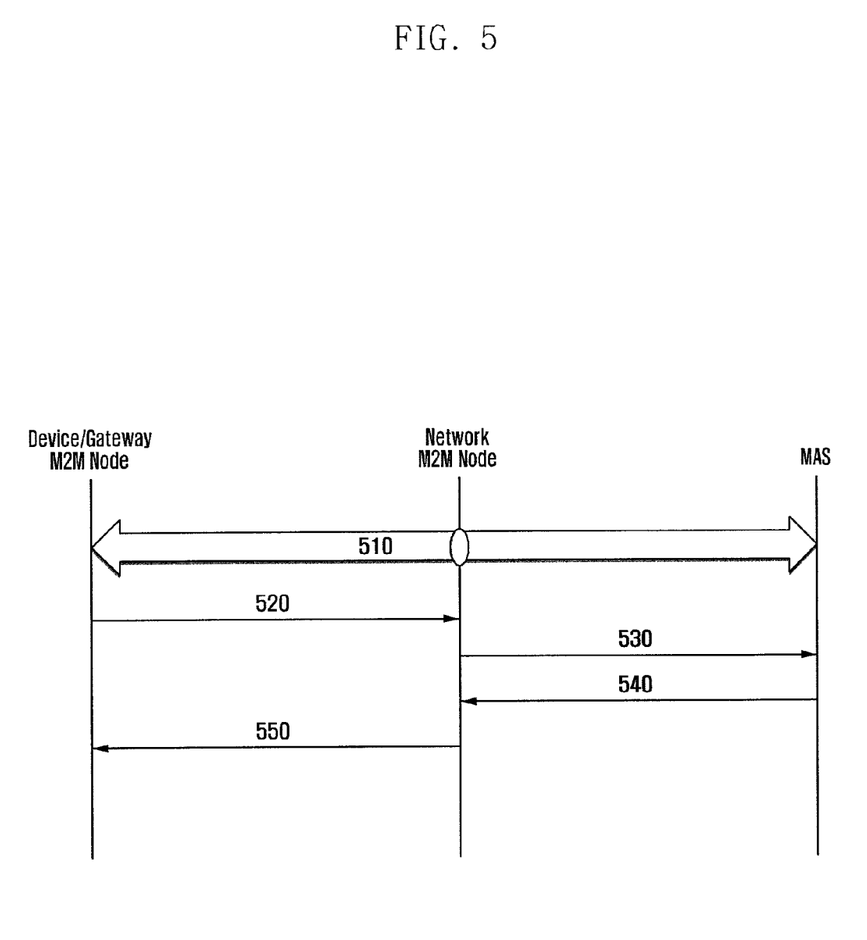
FIG. 5 depicts a call flow for a Device/Gateway-initiated Erase with MAS Procedure according to an exemplary embodiment of the present invention.

FIG. 5 depicts a call flow for a Device/Gateway-initiated Erase with MAS Procedure according to an exemplary embodiment of the present invention.

In step 510, the Device/Gateway initiates the M2M Service Connect Procedure. For the Erase Procedure to take place, it is assumed that the Device/Gateway and the MAS has already executed the Service Connect Procedure. This procedure may involve an intermediary, such as Network M2M Node, or not.

Prior to the Service Connect Procedure, the Device/Gateway and the MAS already share a secret key called Kmr. Depending on the specific protocol used for the Service Connect Procedure, additional keying material may also be present on these end-points (e.g., Extensible Master Session Key (EMSK) when EAP protocol is used).

When the Device/Gateway decides to initiate the Erase Procedure, the Device/Gateway sends an Erase Request to the MAS in step 520. This request may be relayed to the MAS via an intermediary, such as Network M2M Node (as illustrated in FIG. 1), or directly sent to the MAS. The decision to initiate the Erase Procedure belongs to the Device/Gateway and the details are outside the scope of this description.

The Erase Request contains a payload called Erase Token. This token conveys the intent of the sender along with the cryptographic proof about the authentication and integrity of the token.

Erase Token contains the following information elements, and may include additional elements.

M2M Node ID: This information element contains the identifier of the Device/Gateway M2M Node that will be erased.

Key Index: This information element contains the index of the shared secret key (e.g., Kmr index). Such indices are used when there may be multiple instances of the same key. Each instance is distinguished from the others with the help of a key index. This information element may be included only when the key used for the hash function has an index value, and may be omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of request. When variations of erase procedure are needed, this Type may help differentiate among them.

Hash: This information element contains a cryptographically generated hash value in order to provide origin authentication, integrity, and replay protection for the Erase Token.

The following formula is used for computing the hash value: Hash=Hash-function (Secret-key, M2M Node ID|Key Index|Nonce|Type|Other parameters). In the formula, "|" indicates concatenation.

Hash-function is a one-way keyed hash function, for example HMAC-SHA256. Secret-key is a secret key shared between the Device/Gateway and the MAS. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either. Additional parameters (shown as "Other parameters" in the formula) may be added to the formula. If no such parameters are needed, then the "|Other parameters" part of the formula may be omitted. It is shown for the sake of illustrating potential future extensibility.

The Erase Request may be sent over one of many different protocols, such as PANA (in the form of a PANA AVP, which may be carried over PANA Termination Request or another PANA Request packet), Diameter/RADIUS (in the form of an AVP/attribute), HTTP, etc.

In step 530, the MAS receives the Erase Request. If there is an intermediary such as Network M2M Node, the intermediary receives the Erase Request from Device/Gateway and relay the Erase Request to the MAS. The intermediary may have to deal with two different kinds of protocols carrying the request on both sides. For example, the MAS-facing side may be using RADIUS and the Device/Gateway-facing side may be using PANA. According to another exemplary embodiment of the present invention, the intermediary may be eliminated and the request message may be directly sent from the Device/Gateway to the MAS.

In step 540, the MAS receives and processes the Erase Response. When the MAS receives the Erase Request, it shall verify the hash before accepting the request as authentic. The MAS retrieves the Secret-key by using the M2M Node ID and Key index (when present) for a look up from its local key repository. If there is no matching secret key, then the MAS ignores the Erase Request.

If a matching key is found, the matching key is used with the same formula as in Step 520 in order to generate a Hash value. If the computed Hash does not match the Hash value in the Erase Request, then the MAS ignores the Erase Request. If the Hash is a match, then the MAS accepts the incoming Erase Request as valid.

The MAS makes a decision on how to process the Erase Request based on its local policy. For example, an MAS may be permanently configured to reject such requests. If the MAS accepts the Erase Request, then it should delete the Device/Gateway's bootstrapped state after sending the Erase Response back. The MAS may put a delay before deleting such state, in case the Erase Response is not received by the Device/Gateway and the Device/Gateway retransmits the Erase Request (whose processing requires the state be present).

The MAS sends an Erase Response to the Device/Gateway. This response may be sent via an intermediary such as Network M2M Node. Erase Response includes an Erase Token.

The Erase Token may contain the following information elements, and may include additional elements.

M2M Node ID: This information element contains the identifier of the Device/Gateway M2M Node being erased.

Key Index: This information element contains the index of the shared secret key (e.g., Kmr index). Such indices are used when there may be multiple instances of the same key. Each instance is distinguished from the others with the help of a key index. This information element is included only when the key used for the hash function has an index value, omitted otherwise.

Nonce: This information element contains a number generated by the sender. The sender ensures that the same nonce value is not used with the same secret key value before, either by itself or by the other end-point. The value may be generated randomly, sequentially, or by any other pattern.

Type: This information element contains a value that indicates the type of response. The Type may indicate values corresponding to "Successfully erased", "Erase rejected due to local policy", etc.

Hash: This information element contains a cryptographically generated hash value in order to provide origin authentication, integrity and replay protection for the Erase Token.

The following formula is used for computing the hash value: Hash=Hash-function (Secret-key, M2M Node ID|Key Index|Nonce|Type|Other parameters). In the formula, "|" indicates concatenation.

Hash-function is a one-way keyed hash function, for example HMAC-SHA256.

Secret-key is a secret key shared between the Device/Gateway and the MAS. The Secret-key may be Kmr, EMSK, or another shared secret key. Such variations of this formula are valid.

M2M Node ID, Key Index, Nonce, and Type are the values of the aforementioned information elements. When any of these information elements are not present in the token, they are not included in the hash computation either. Additional parameters (shown as "Other parameters" in the formula) may be added to the formula. If no such parameters are needed, then the "|Other parameters" part of the formula may omitted. It is shown for the sake of illustrating potential future extensibility.

In step 550, the Erase Response is sent over the same protocol that carried the Erase Request.

If there is an intermediary such as Network M2M Node, the intermediary receives the Erase Response from MAS and relays the request to the Device/Gateway. The intermediary may have to deal with two different kinds of protocols carrying the response on both sides. For example, the MAS-facing side may be using RADIUS and the Device/Gateway-facing side may be using PANA. According to an exemplary embodiment of the present invention, the intermediary may be omitted and the response message may be directly sent from the MAS to the Device/Gateway.

When the Device/Gateway receives the Erase Response, the Device/Gateway verifies the hash before accepting the response as authentic. The Device/Gateway retrieves the Secret-key by using the M2M Node ID and Key index (when present) for a look up from its local key repository. If there is no matching key, then the Device/Gateway ignores the Erase Response.

If a matching key is found, the matching key is used with the same formula as in step 540 in order to generate a Hash value. If the computed Hash does not match the Hash value in the Erase Request, then the Device/Gateway ignores the Erase Response.

If the Hash is a match, then the Device/Gateway accepts this incoming Erase Response as valid. The Device/Gateway decides what to do with the bootstrapped state associated with itself based on the received Type and its local policy.

Figure 6A:
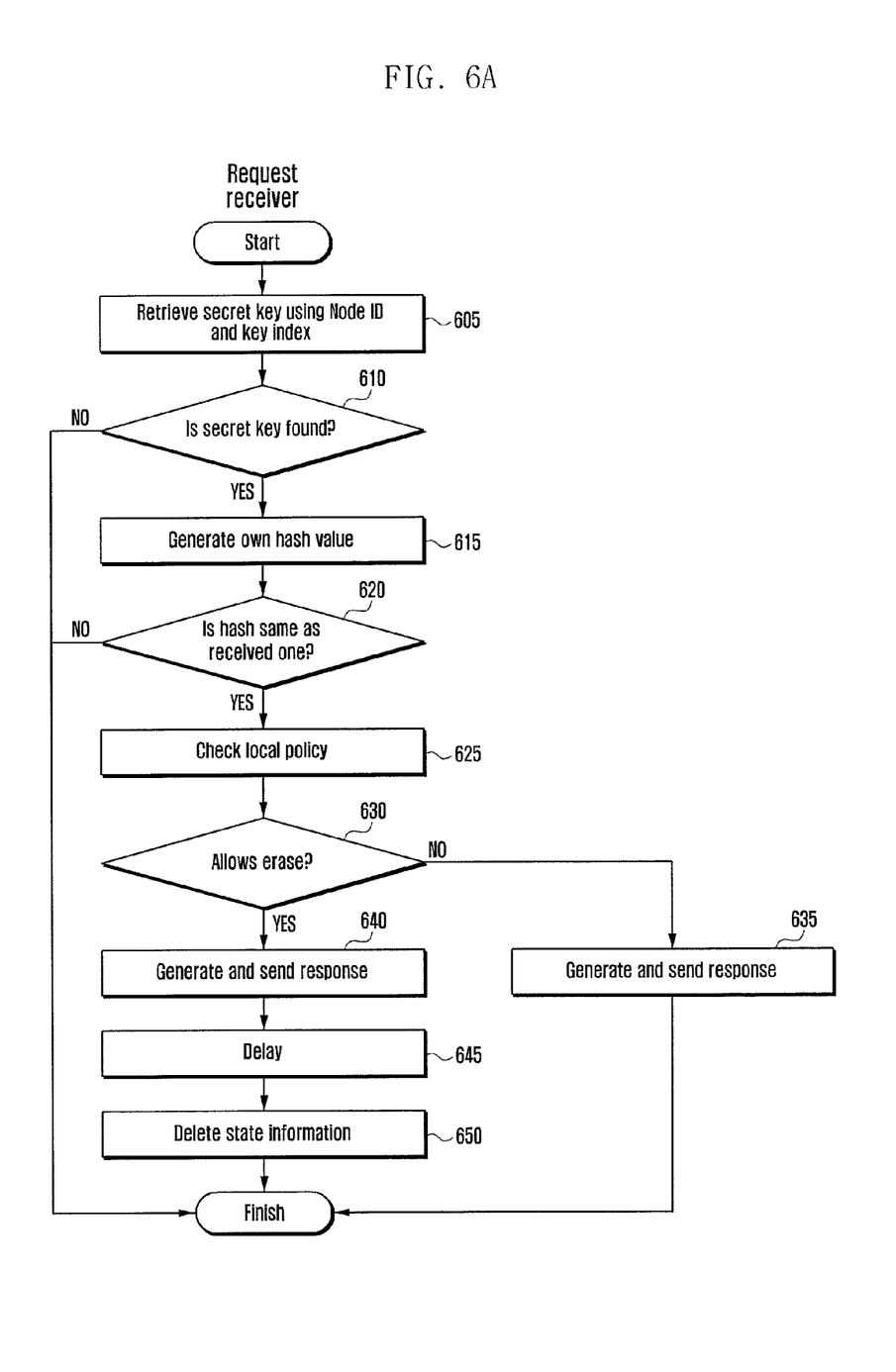
FIGS. 6A and 6B are a Flowchart for request/response processing according to an exemplary embodiment of the present invention.
Figure 6B:
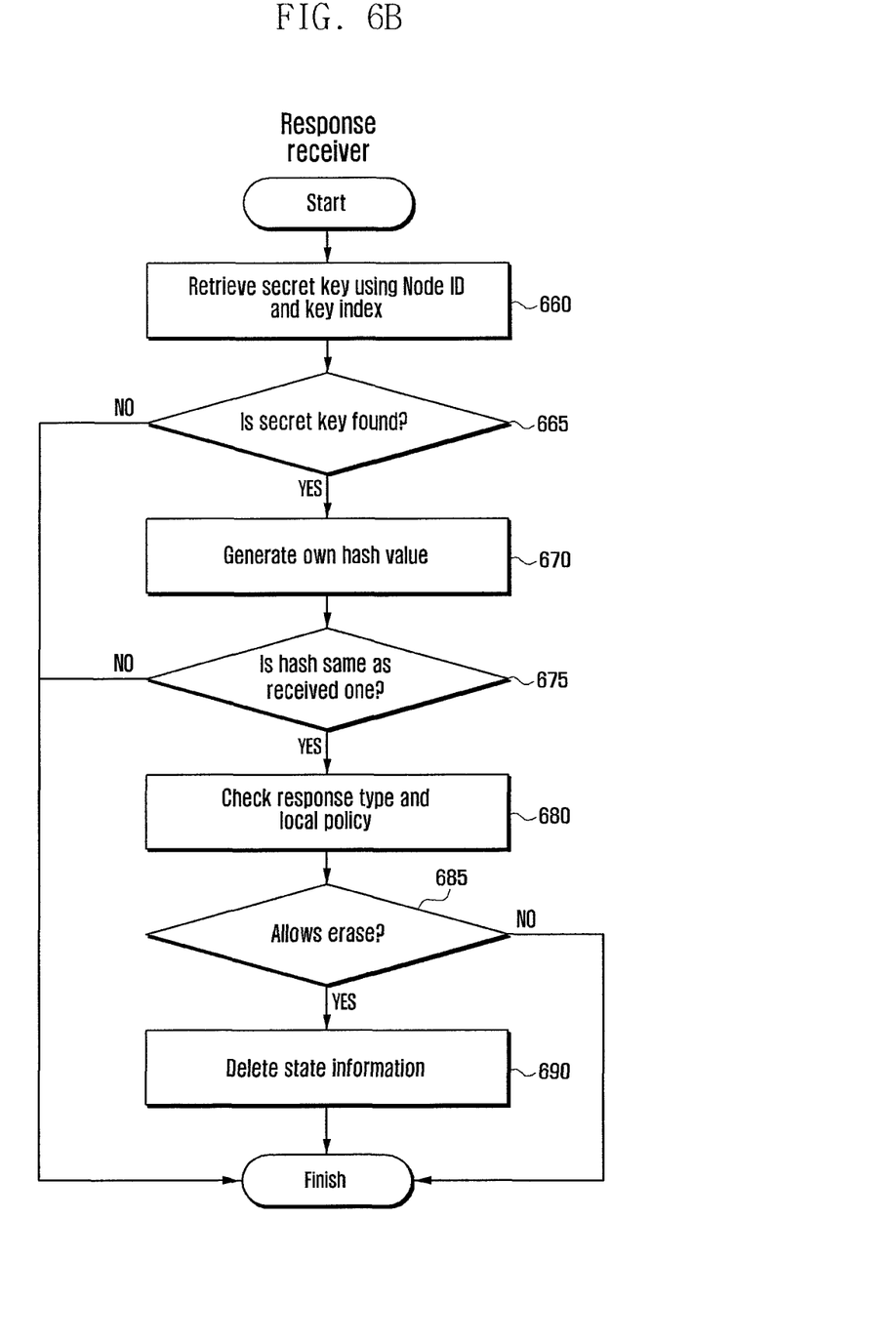

FIGS. A and 6B depict processing of request and response messages in the form of flowcharts according to an exemplary embodiment of the present invention.

Referring to FIGS. 6A and 6B, Request receiver is the entity that receives the Erase Request (e.g., MSBF and MAS in the case of Device/Gateway initiated Erase Procedure). Response receiver is the entity that sends the request and receives the response (e.g., Device/Gateway in the case of Device/Gateway initiated Erase Procedure).

Exemplary embodiments of the present invention are applicable to M2M systems whether they use automated bootstrapping of the M2M Devices/Gateways, or they rely on pre-provisioning (e.g., during manufacturing time). According to exemplary embodiments of the present invention, any method may be used as the bootstrap and connection procedures (e.g., PANA, TLS, GBA). Exemplary embodiments of the present invention may be employed no matter what method is used for creating the M2M state.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for erasing bootstrapping, at a device or a gateway in a Machine-to-Machine (M2M) service, the method comprising:
   receiving an erase request containing a first payload from an M2M Authentication Server (MAS) or an M2M Service Bootstrapping Function (MSBF);
   processing the erase request based on a local policy of the device or the gateway; and
   sending an erase response containing a second payload to the MAS or the MSBF.

2. The method of claim 1,
   wherein the first payload comprises at least one of an M2M Node ID identifying the device or the gateway that will be erased, a Key index containing an index of a secret key, a Nonce value generated by the MAS or the MSBF, a Type indicating a type of the first payload, or a cryptographically generated Hash value; and
   wherein the second payload contains at least one of the M2M Node ID, the Key index, the Nonce value copied from the received erase request, a Type containing a value that indicates a type of the second payload, or the cryptographically generated Hash value.

3. The method of claim 2, wherein the processing of the erase request further comprises:
   retrieving the secret key based on the M2M Node ID or Key index from a local key repository of the device or the gateway;
   generating a hash value using the secret key; and
   matching the generated hash value against the cryptographically generated Hash value included in the erase request.

4. The method of claim 3, wherein the hash value is generated by Hash=HMAC-SHA256(Kmr, M2M Node ID|Key Index|Nonce|Type).

5. The method of claim 1, wherein the erase request or the erase response is received or is sent via a network Node.

6. The method of claim 1, wherein the processing of the erase request further comprises:
   verifying a hash using the first payload.

7. The method of claim 1, wherein the erase request is received over a PANA Termination Request, and the erase response is sent over a PANA Termination Answer.

8. A method for erasing bootstrapping, at a device or a gateway for a Machine-to-Machine (M2M) service, the method comprising:
   sending an erase request containing a first payload to an MAS or an M2M Service Bootstrapping Function (MSBF);
   receiving an erase response containing a second payload from the MAS or the MSBF; and
   processing a bootstrapped state associated with the device or the gateway based on the received erase response or a local policy of the device or the gateway.

9. The method of claim 8,
   wherein the first payload contains at least one of an M2M Node ID identifying the device or the gateway that will be erased, a Key index containing an index of a secret key, a Nonce value generated by the device or the gateway, a Type indicating a type of the first payload of the erase request, or a cryptographically generated Hash value; and
   wherein the second payload contains at least one of the M2M Node ID, the Key index, the Nonce value copied from the received erase request, a Type indicating a type of the second payload, or the cryptographically generated Hash value.

10. The method of claim 9, wherein the processing of the bootstrapped state further comprises:
    retrieving the secret key based on the M2M Node ID or Key index from a local key repository of the device or the gateway;
    generating a hash value using the secret key; and
    matching the generated hash value against the cryptographically generated Hash included in the erase response.

11. The method of claim 10, wherein the hash value is generated by Hash=HMAC-SHA256(Kmr, M2M Node ID|Key Index|Nonce|Type).

12. The method of claim 8, wherein the erase request or the erase response is received or is sent via a network Node.

13. The method of claim 8, wherein the processing of the bootstrapped state further comprises:
    verifying a hash using the second payload.

14. The method of claim 8, wherein the erase request is sent over a PANA Termination Request, and the erase response is received over a PANA Termination Answer.

15. A device or a gateway for erasing bootstrapping in a Machine-to-Machine (M2M) service, the device or the gateway comprising:
    a transceiver configured to communicate signals with a network entity, an M2M Authentication Server (MAS) or an M2M Service Bootstrapping Function (MSBF); and
    a controller configured to receive an erase request containing a first payload from the MAS or the MSBF, to process the erase request based on a local policy of the device or the gateway, and to send an erase response containing a second payload to the MAS or the MSBF.

16. The device or the gateway of claim 15,
    wherein the first payload contains at least one of an M2M Node ID identifying the device or the gateway that will be erased, a Key index of a secret key, a Nonce value generated by the MAS or the MSBF, a Type indicating a type of the first payload, or a cryptographically generated Hash value; and
    wherein the second payload contains at least one of the M2M Node ID, the Key index, the Nonce value copied from the received erase request, a Type indicating a type of the second payload, or the cryptographically generated Hash value.

17. The device or the gateway of claim 16, wherein the controller is configured to retrieves the secret key based the M2M Node ID or Key index from a local key repository of the device or the gateway, to generate a hash value using the secret key, and to match the generated hash value against the cryptographically generated Hash value of the erase request.

18. The device or the gateway of claim 17, wherein the hash value is generated by Hash=HMAC-SHA256(Kmr, M2M Node ID|Key Index|Nonce|Type).

19. The device or the gateway of claim 15, wherein the erase request or the erase response is received or is sent via a network Node.

20. The device or the gateway of claim 15, wherein the controller configured to verify a hash using the first payload.

21. The device or the gateway of claim 15, wherein the erase request is received over a PANA Termination Request, and the erase response is sent over a PANA Termination Answer.

22. A device or a gateway for erasing bootstrapping in a Machine-to-Machine (M2M) service, the device or the gateway comprising:
    a transceiver configured to communicate signals with a network entity, an M2M Authentication Server (MAS) or an M2M Service Bootstrapping Function (MSBF); and
    a controller configured to send an erase request containing a first payload to an MAS or an MSBF, to receive an erase response containing a second payload from the MAS or the MSBF and to process a bootstrapped state associated with the device or gateway based on the received erase response or a local policy of the device or the gateway.

23. The device or the gateway of claim 22,
    wherein the first payload contains at least one of an M2M Node ID identifying the device or the gateway that will be erased, a Key index of a secret key, a Nonce value generated by the MAS or the MSBF, a Type indicating a type of the first payload, or a cryptographically generated Hash value; and
    wherein the second payload contains at least one of the M2M Node ID, the Key index, the Nonce value copied from the received erase request, a Type indicating a type of the second payload, or the cryptographically generated Hash value.

24. The device or the gateway of claim 23, wherein the controller is configured to retrieves the secret key based on the M2M Node ID or Key index from a local key repository of the device or the gateway, to generates a first hash value using the secret key, and to match the generated hash value against the cryptographically generated Hash value of the erase response.

25. The device or the gateway of claim 24, wherein the hash value is generated by Hash=HMAC-SHA256(Kmr, M2M Node ID|Key Index|Nonce|Type).

26. The device or the gateway of claim 22, wherein the erase request or the erase response is received or is sent via a network Node.

27. The device or the gateway of claim 22, wherein the controller is configured to verify a hash using the second payload.

28. The device or the gateway of claim 22, wherein the erase request is sent over a PANA Termination Request, and the erase response is received over a PANA Termination Answer.

29. A method for erasing bootstrapping, at an M2M Authentication Server (MAS) or an M2M Service Bootstrapping Function (MSBF) in a Machine-to-Machine (M2M) service, the method comprising:
    sending an erase request containing a first payload to a device or a gateway;
    receiving an erase response containing a second payload from the device or the gateway; and
    processing a bootstrapped state associated with the device or the gateway based on the received erase response or a local policy of the MAS or the MSBF.

30. The method of claim 29,
    wherein the first payload contains at least one of an M2M Node ID identifying the device or the gateway that will be erased, a Key index of a secret key, a Nonce value generated by the MAS or the MSBF, a Type indicating a type of the first payload, or a cryptographically generated Hash value; and
    wherein the second payload contains at least one of the M2M Node ID, the Key index, the Nonce value copied from the received erase request, a Type indicating a type of the second payload, or a cryptographically generated Hash value.

31. The method of claim 30, wherein the processing of the bootstrapped state further comprises:
    retrieving the secret key based on the M2M Node ID and Key index from a local key repository of the MAS or the MSBF;
    generating a hash value using the secret key; and
    matching the generated hash value against the cryptographically generated Hash included in the erase response.

32. The method of claim 29, wherein the processing of the bootstrapped state further comprises:
    verifying a hash using the payload.

33. The method of claim 32, wherein the hash value is generated by Hash=HMAC-SHA256(Kmr, M2M Node ID|Key Index|Nonce|Type).

34. The method of claim 29, wherein the erase request or the erase response is sent or is received via a network Node.

35. A method for erasing bootstrapping, at an M2M Authentication Server (MAS) or an M2M Service Bootstrapping Function (MSBF) in a Machine-to-Machine (M2M) service, the method comprising:
    receiving an erase request containing a first payload from a device or a gateway;
    processing the erase request based on a local policy of the MAS or the MSBF; and
    sending an erase response containing a second payload to the device or the gateway.

36. The method of claim 35,
    wherein the first payload contains at least one of an M2M Node ID identifying the device or the gateway that will be erased, Key index of a secret key, a Nonce value generated by the device or the gateway, a Type indicating a type of the first payload, or a cryptographically generated Hash value; and
    wherein the second payload contains at least one of the M2M Node ID, the Key index, the Nonce value copied from the received erase request, a Type indicating a type of the second payload, or a cryptographically generated Hash value.

37. The method of claim 36, wherein the processing of the erase request further comprises:
    retrieving the secret key based on the M2M Node ID or Key index from a local key repository of the MAS or the MSBF;
    generating a hash value using the secret key; and
    matching the generated hash value against the cryptographically generated Hash included in the erase request.

38. The method of claim 35, wherein the processing of the erase request further comprises:
  verifying a hash using the first payload.

39. The method of claim 38, wherein the hash value is generated by Hash=HMAC-SHA256(Kmr, M2M Node ID|Key Index|Nonce|Type).

40. The method of claim 35, wherein the erase request or the erase response is received or is sent via a network Node.

41. An M2M Authentication Server (MAS) or an M2M Service Bootstrapping Function (MSBF) for erasing bootstrapping in a Machine-to-Machine (M2M) service, the MAS or the MSBF comprising:
  a transceiver configured to communicate signals with a network entity, a device or a gateway; and
  a controller configured to send an erase request containing a first payload to a device or a gateway, to receive an erase response containing a second payload from the device or the gateway, and to process a bootstrapped state associated with the device or the gateway based on the received erase response or a local policy of the MAS or the MSBF.

42. The MAS or the MSBF of claim 41,
  wherein the first payload contains at least one of an M2M Node ID identifying the device or the gateway that will be erased, Key index a secret key, a Nonce value generated by the MAS or the MSBF, a Type indicating a type of the first payload, or a cryptographically generated Hash value; and
  wherein the second payload contains at least one of the M2M Node ID, the Key index, the Nonce value copied from the received erase request, a Type indicating a type of the second payload, or a cryptographically generated Hash value.

43. The MAS or the MSBF of claim 42, wherein the controller configured to retrieve the secret key based on the M2M Node ID and Key index from a local key repository of the MAS or the MSBF, to generate a hash value using the secret key, and to match the generated hash value against the cryptographically generated Hash included in the erase response.

44. The MAS or the MSBF of claim 41, wherein he controller configured to verify a hash using the first payload.

45. The MAS or the MSBF of claim 44, wherein the hash value is generated by Hash=HMAC-SHA256(Kmr, M2M Node ID|Key Index|Nonce|Type).

46. The MAS or the MSBF of claim 41, wherein the erase request or the erase response is sent or is received via a network Node.

47. An M2M Authentication Server (MAS) or an M2M Service Bootstrapping Function (MSBF) for erasing bootstrapping in a Machine-to-Machine (M2M) service, the MAS or the MSBF comprising:
  a transceiver configured to communicate signals with a network entity, a device or a gateway; and
  a controller configured to receive an erase request containing a first payload from a device or a gateway, to process the erase request based on a local policy of the MAS or the MSBF, and to send an erase response containing a second payload to the device or the gateway.

48. The MAS or the MSBF of claim 47,
  wherein the first payload contains at least one of an M2M Node ID identifying the device or the gateway that will be erased, Key index of a secret key, a Nonce value generated by the device or the gateway, a Type indicating a type of the first payload, or a cryptographically generated Hash value; and
  wherein the second payload contains at least one of the M2M Node ID, the Key index, the Nonce value copied from the received erase request, a Type indicating a type of the second payload, or a cryptographically generated Hash value.

49. The MAS or the MSBF of claim 48, wherein the controller configured to retrieve the secret key based on the M2M Node ID or Key index from a local key repository of the MAS or the MSBF, to generate a Hash value using the secret key, and to match the generated hash value against the Hash included in the erase request.

50. The MAS or the MSBF of claim 47, wherein the controller configured to verify a hash using the first payload.

51. The MAS or the MSBF of claim 50, wherein the hash value is generated by Hash=HMAC-SHA256(Kmr, M2M Node ID|Key Index|Nonce|Type).

52. The MAS or the MSBF of claim 47, wherein the erase request or the erase response is received or is sent via a network Node.

* * * * *